(12) United States Patent
Dottax et al.

(10) Patent No.: US 9,049,021 B2
(45) Date of Patent: Jun. 2, 2015

(54) METHOD FOR DETERMINING THE COFACTOR OF AN ELLIPTIC CURVE, CORRESPONDING ELECTRONIC COMPONENT AND COMPUTER PROGRAM PRODUCT

(71) Applicant: Oberthur Technologies, Levallois Perret (FR)

(72) Inventors: Emmanuelle Dottax, Levallois Perret (FR); Sebastien Aumonier, Rennes Cedex (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 3 days.

(21) Appl. No.: 13/723,552

(22) Filed: Dec. 21, 2012

(65) Prior Publication Data

US 2013/0163751 A1    Jun. 27, 2013

(30) Foreign Application Priority Data

Dec. 21, 2011    (FR) .................................... 11 62135

(51) Int. Cl.
*H04L 9/28*        (2006.01)
*G06F 7/72*        (2006.01)
*H04L 9/30*        (2006.01)

(52) U.S. Cl.
CPC ............... *H04L 9/28* (2013.01); *H04L 9/3066* (2013.01); *G06F 7/725* (2013.01)

(58) Field of Classification Search
CPC ................................ H04L 9/28; H04L 9/3066
USPC ....................................................... 380/28, 30
See application file for complete search history.

(56) References Cited

U.S. PATENT DOCUMENTS

| 6,389,443 | B1 | 5/2002 | Philipsson | |
|---|---|---|---|---|
| 6,625,632 | B1 | 9/2003 | Kotlov | |
| 6,816,594 | B1 * | 11/2004 | Okeya | 380/59 |
| 8,213,604 | B2 * | 7/2012 | Xu | 380/30 |
| 8,233,615 | B2 * | 7/2012 | Douguet et al. | 380/28 |
| 8,433,918 | B2 * | 4/2013 | Ho | 713/184 |
| 8,781,117 | B2 * | 7/2014 | Schneider | 380/46 |
| 2004/0174995 | A1 * | 9/2004 | Singh | 380/30 |
| 2006/0059216 | A1 | 3/2006 | Huang et al. | |

OTHER PUBLICATIONS

D. Hankerson et al.: "Guide to Elliptic Curve Cryptography", 2004, Springer-Verlag New York, Inc., 332 pages.

(Continued)

*Primary Examiner* — Linglan Edwards
(74) *Attorney, Agent, or Firm* — David D. Brush; Westman, Champlin & Koehler, P.A.

(57) ABSTRACT

A method and apparatus are proposed for cryptographic computations implemented in an electronic component. The method includes determining the cofactor of an elliptic curve E defined over a finite field $F_q$ with q elements, the elliptic curve comprising a base point P having an order equal to n. The step of determining includes determining a value of floor$((q+2^{ceil(b/2)+1}+1)/n)$ when $n > 6\sqrt{q}$, where the function ceil corresponds to the ceiling function, floor corresponds to the floor function, and b corresponds to the size q in number of bits of q.

18 Claims, 2 Drawing Sheets

Cofactor of E

(56) References Cited

OTHER PUBLICATIONS

Figure 1:
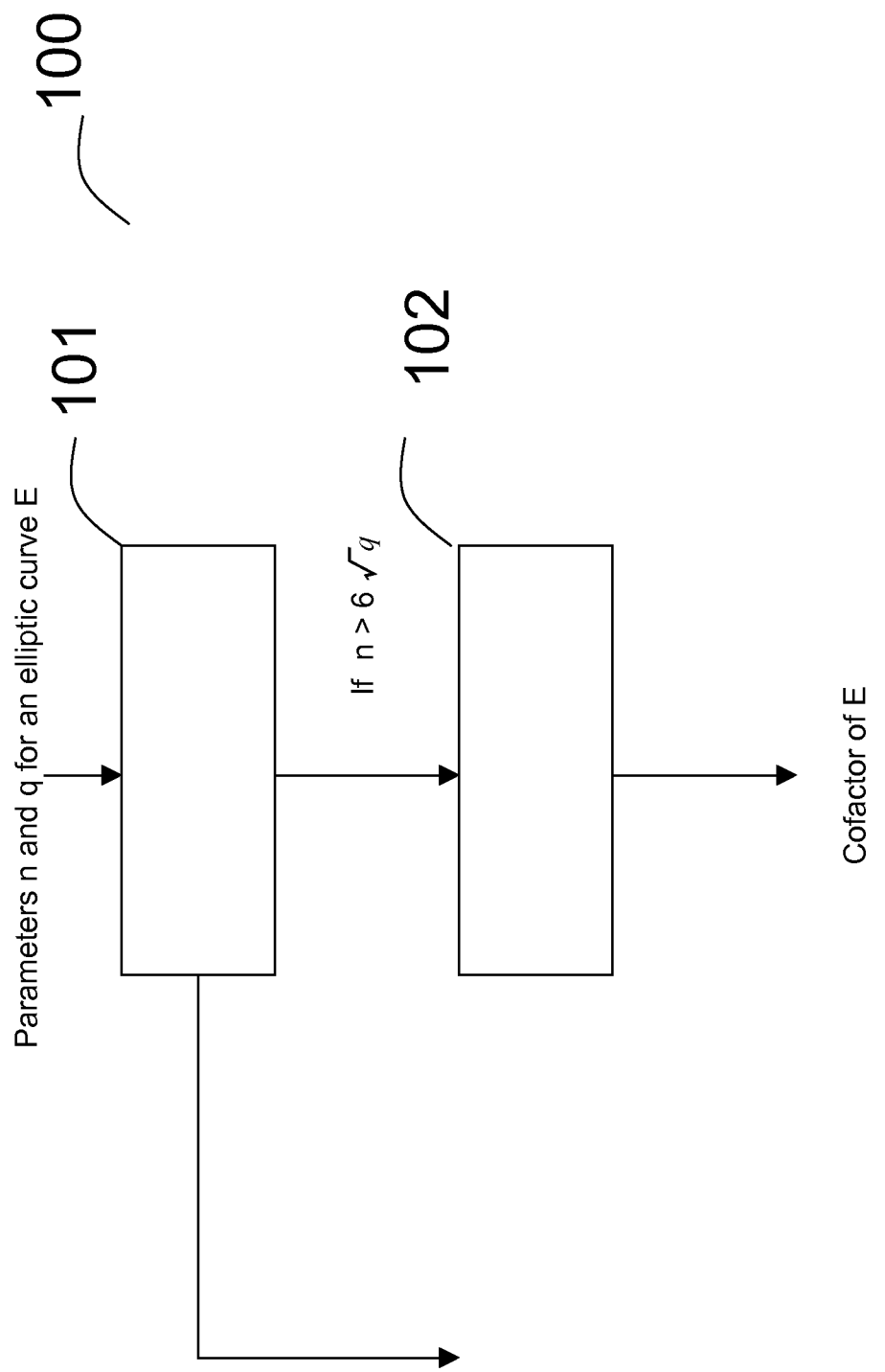

Barker et al.: "Recommendation for Pair-Wise Key Establishment Schemes Using Discrete Logarithm Cryptography", National Institute of Standards and Technology, NIST Special Publication 800-56A, Mar. 2007, 114 pages.

"Supplemental Access Control for Machine Readable Travel Documents", ISO/IEC JT C1 SC17 WG3/TF5 for the International Civil Aviation Organization (ICAO), version—1.01, Nov. 11, 2010, 33 pages.

Technical Guideline TR-03111: "Elliptic Curve Cryptography", Bundesamt fur Sicherheit in der Informationstechnik (BSI) version 1.11, Apr. 17, 2009, 34 pages.

* cited by examiner

METHOD FOR DETERMINING THE COFACTOR OF AN ELLIPTIC CURVE, CORRESPONDING ELECTRONIC COMPONENT AND COMPUTER PROGRAM PRODUCT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of cryptography.

More specifically, the disclosure pertains to a technique for determining the cofactor of a given elliptic curve.

The disclosure has numerous applications, especially in the context of electronic passports.

More generally, it can be applied to all cryptographic protocols and algorithms based on the use of elliptic curves.

TECHNOLOGICAL BACKGROUND

Let E be an elliptic curve defined over a finite field $F_q$, corresponding to the finite field with q elements, where $q=p^m$, with p being a prime number and m being an integer greater than or equal to one. A base point P belonging to this curve (i.e. the base point $P \in E(F_q)$), is deemed to have an order equal to n.

Before using such an elliptic curve in cryptographic applications, it is appropriate to verify several parameters (cf. §4.2 of document A1 entitled: *"Guide to elliptic curve cryptography"* by D. Hankerson et al.) ensuring the security of such a curve. Among these parameters, the cofactor h of such an elliptic curve verifying the following equation: $h = \#E(F_q)/n$ (where $\#E(F_q)$ corresponds to the cardinal of the elliptic curve) must be determined in order especially to prevent attacks of the "small subgroup attacks" type (cf. §4.3 of document A1). Indeed, when the cofactor h of an elliptic curve is great, the curve potentially has a weakness because of the possibility of attacks of the "small subgroup attack" being carried out. In addition, the cofactor h of an elliptic curve is increasingly being used to specify novel cryptographic protocols (such as for example the ECC CDH (*Elliptic Curve Cryptography Cofactor Diffie-Hellman*) protocol. Other examples of applications are described in *"Recommendation for Pair-Wise Key Establishment Schemes Using Discrete Logarithm Cryptography"* (the reference of this document is: NIST SP800-56A), and in the document *"Supplemental Access Control for Machine Readable Travel Documents* (v. 1.01)" published by the ICAO (International Civil Aviation Organization).

However, determining the cofactor of an elliptic curve within an electronic component such as a microcontroller of a smart card is not easy. This is because the techniques for determining the cardinal of an elliptic curve are costly (in terms of complexity of the computing operations to be carried out). This point is mentioned in §4.2.3 of the document A1, in relation to the use, for example, of a technique developed by Satoh as well as variants such as the algorithm called the SST (Satoh-Skjemaa-Taguchi) algorithm or the AGM (arithmetic geometric mean) algorithm.

From this prior-art document, there is a known solution using the inequality of the Hasse theorem which, when $n > 4\sqrt{q}$, proposes a more precise technique, that is, we have: $h = \text{floor}((\sqrt{q}+1)^2/n)$ where the function floor($\cdot$) corresponds to the function called an integer part.

Thus, determining the cofactor in this example necessitates determining the square root of q.

To determine the square root of q, those skilled in the art would have used one of the techniques described in the documents U.S. Pat. No. 6,389,443, U.S. Pat. No. 6,625,632 and U.S.-2006/0059216, which propose techniques for determining a square root to determine the value of the cofactor.

However, one drawback of these methods for determining square roots is that they are costly to implement and that, in addition, they necessitate modifications in an electronic component such as a microcontroller of a smart card that has to implement the determining of a cofactor.

SUMMARY

In one particular embodiment, a method is proposed for cryptographic computations implemented in an electronic component comprising determining the cofactor of an elliptic curve E defined over a finite field $F_q$ with q elements, said elliptic curve comprising a base point P having an order equal to n. Such a method is remarkable in that said determining comprises determining a value of $\text{floor}((q+2^{ceil(b/2)+1}+1)/n)$ when $n > 6\sqrt{q}$, where the function ceil corresponds to the ceiling function, floor corresponds to the floor function, and b corresponds to the size q in number of bits of q.

The general principle of an exemplary embodiment therefore includes determining the value of the cofactor in using operations that are simple to implement.

At least one embodiment is aimed especially at overcoming these different drawbacks of the prior art.

More specifically, at least one embodiment provides a technique for determining the cofactor of an elliptic curve that is easy to implement especially in terms of the number and complexity of the computational operations used.

Thus, this particular embodiment makes it possible to determine the value of the cofactor verifying a particular condition which, by the choice of parameters n and q, is often verified.

In one preferred embodiment, it is not necessary to verify the criterion $n > 6\sqrt{q}$ because it is verified through the method for building elliptic curves (see for example curves standardized by the NIST).

According to one particular aspect of the disclosure, there is proposed a method for cryptographic computations for which $q = 2^m$ where m is an integer greater than or equal to one.

According to one particular aspect of the disclosure, there is proposed a method for cryptographic computations for which $q = p$ where p is a prime number greater than or equal to three.

According to one particular aspect of the disclosure, a method is proposed for cryptographic computations furthermore comprising a step of comparison between n and $6\sqrt{q}$.

According to one particular aspect of the disclosure, a method is proposed for cryptographic computations that is remarkable in that the step of comparison comprises:

determining $A := 36\,q$;
determining $B := n^2$;
comparing A and B.

Thus, the step of comparing n with $6\sqrt{q}$ does not necessitate the determining of a square root. It requires only three operations: a squaring, a multiplication and a subtraction, as in the prior-art techniques.

Another embodiment of the disclosure proposes a computer program product comprising program code instructions to implement the above-mentioned method (in any one of its different embodiments) when said program is executed on a computer.

Another embodiment of the disclosure proposes a computer-readable and non-transient storage medium storing a computer program comprising a set of computer-executable instructions to implement the above-mentioned method (in any one of its different embodiments).

Another embodiment of the disclosure proposes an electronic component comprising means for cryptographic computations comprising means for determining the cofactor of an elliptic curve E defined over a finite body $F_q$ with q elements, said elliptic curve comprising a base point P having an order equal to n. Said means for determining are remarkable in that they comprise means for determining a value of floor $((q+2^{ceil(b/2)+1}+1)/n)$ when $n>6\sqrt{q}$, where the function ceil corresponds to the ceiling function, floor corresponds to the floor function, and b corresponds to the size of q in number of bits.

According to one particular aspect of the disclosure, there is proposed an electronic component which is remarkable in that the means for comparing comprise means for comparing n and $6\sqrt{q}$.

According to one particular aspect of the disclosure, there is proposed a secured module comprising an electronic component of this kind.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM, for example a CD-ROM or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc) and is capable of accessing the hardware resources of this physical entity (memories, recording media, communications buses, input/output electronic boards, user interfaces, etc).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc.

LIST OF FIGURES

Figure 2:
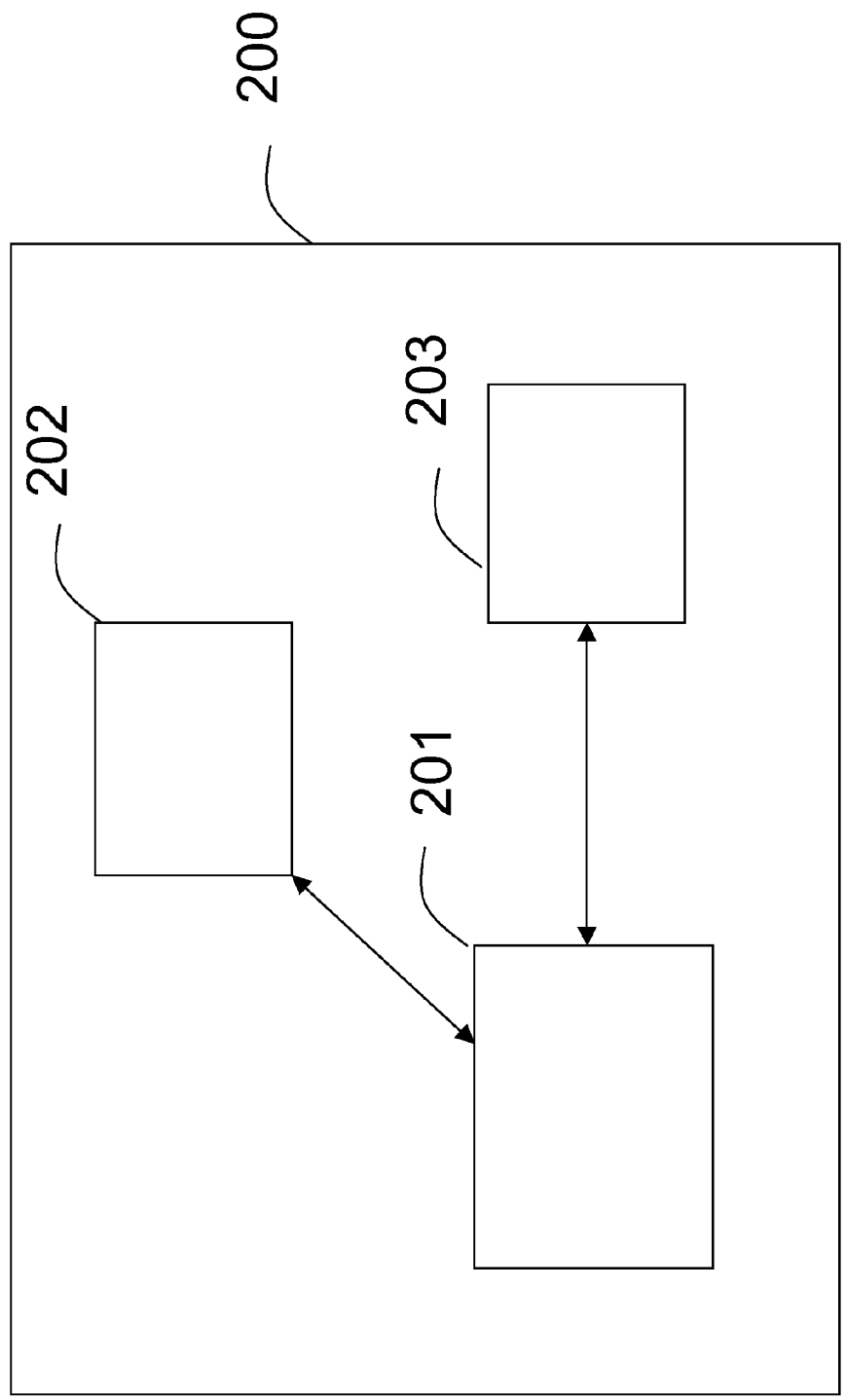

Other features and advantages shall appear more clearly from the following description, given by way of a non-exhaustive and indicative example and from the appended drawings, of which:

FIG. 1 is a flowchart of a particular embodiment of the method;

FIG. 2 presents the structure of an electronic component according to one particular embodiment.

DETAILED DESCRIPTION

In all the figures of the present document, the identical elements and steps are designated by same numerical references. As explained here above, one embodiment pertains to a method of cryptographic computation implemented in an electronic component.

FIG. 1 is a flowchart of a particular embodiment of the method.

More specifically, FIG. 1 shows a step 100 for determining a cofactor of an elliptic curve that is implemented during the execution of a cryptographic protocol or algorithm (such as for example the ECC CDH protocol or in a protocol for validating parameters of the domain of an elliptic curve).

Such a step 100 for determining makes it necessary to obtain the element q (corresponding to an integer power of a prime number) which defines the finite field with q elements, as well as the order of the generator group generated by a base point P, equal to n.

The present step of determining comprises:
  a step 101 for comparing numbers n and $6\sqrt{q}$ (consisting in one embodiment and comparing the values of $n^2$ and 36 q); and
  a step 102 for determining the value of floor$((q+2^{ceil(b/2)+1}+1)/n)$ if the following condition is verified $n>6\sqrt{q}$ (which is validated or not validated during the performance of the step 101) where the function ceil corresponds to the ceiling function, floor corresponds to the floor function, and b corresponds to the size q in number of bits of q. This value thus determined corresponds to the value of the cofactor of the elliptic curve considered.

Indeed, starting from the following inequality: $(q+2^{((b-1)/2)+1}+1) \leq \text{floor}((\sqrt{q}+1)^2/n) < (q+2^{ceil(b/2)+1}+1)/n$ and noting that, since $h=\text{floor}((\sqrt{q}+1)^2/n)$, there are no integers strictly included between h and $(\sqrt{q}+1)^2/n$, then to prove that $\text{floor}((q+2^{ceil(b/2)+1}+1)/n)=h$, it is necessary that there should be no integers between h and $(q+2^{ceil(b/2)+1}+1)/n$, i.e. the size of the interval between hn and $(q+2^{ceil(b/2)+1}+1)$ should be smaller than n.

However, we have $(q+2^{ceil(b/2)+1}+1)-hn<(q+2^{ceil(b/2)+1}+)-(q+1-2\sqrt{q})$ (according to Hasse's theorem).

Thus, we have therefore $(q+2^{ceil(b/2)+1}+1)-hn<2^{ceil(b/2)}+2\sqrt{q}$.

This means that we can write that $(q+2^{ceil(b/2)+1}+1)-hn<4\sqrt{q}+2\sqrt{q}=6\sqrt{q}$.

Now, since the following condition is verified $n>6\sqrt{q}$, we get $h=\text{floor}((q+2^{ceil(b/2)+1}+1)/n)$.

Thus, this technique for determining a cofactor of an elliptic curve is less costly than the prior-art techniques since the techniques described in the documents U.S. Pat. No. 6,389,443, U.S. Pat. No. 6,625,632 and U.S.-2006/0059216 necessitate a greater number of computations.

FIG. 2 shows the structure of a special purpose electronic component according to one particular embodiment.

The electronic component 200 has a random-access memory (or RAM) 202 which works like a main memory of a computation unit or central processing unit (CPU) 201. The capacity of this random-access memory 202 can be extended by an optional random-access memory connected to an expansion port (not shown in FIG. 2). The electronic component 200 also has a read-only memory (ROM) 203. After being powered on, the central processing unit 201 is capable of executing instructions that are contained in the random-access memory 202 and relate to a computer program once these instructions have been loaded from the read-only memory 203 or from an external memory (not shown in the present figure). A computer program of this kind, if executed by the computation unit 201, enables the execution of a part or of all the steps mentioned in FIG. 1, when the device 200 represents for example an electronic component.

In one alternative embodiment, the steps mentioned in FIG. 1 can be implemented in hardware form in an FPGA (field programmable gate array) type or ASIC (applications-specific integrated circuit) type programmable component. Thus, the electronic component, in one embodiment, may comprise means of comparison between n and $6\sqrt{q}$ as well as means for determining a value of $\text{floor}((q+2^{ceil(b/2)+1}+1)/n)$ making it possible to determine the value of the cofactor of an elliptic curve defined on $F_q$.

In one embodiment, such method can be used in order to enable two devices (for example a smart card and a terminal (or a server) which are electronic components) to use cryptographic functions based on ECC for performing encryption, authentication, signature, key exchange, etc. . . .

Indeed, in the case that a device (either the server or the smart card) decides to generate a cryptographically secure domain parameters, named D, (as specified in the §4.2.1 of document A1), it must determine all the following relevant values of parameters of an elliptic curve:

the field order q;
an indication FR (field representation) of the representation used for the element of $F_q$;
a seed S (which is a relevant parameter for only an elliptic curve which is randomly generated in accordance with the Algorithm 4.17, or Algorithm 4.19 of the §4.2.1 of document A1);
two coefficients a, b which belong to $F_q$ that define the equation of an elliptic curve E over $F_q$;
two elements $x_P$, $y_P$ which belong to $F_q$ that define a finite point P, which belongs to the elliptic curve, such point that must have a prime order is called a base point;
the order n of P;
the cofactor $h=\#E(F_q)/n$.

However, the determination of such secure domain parameters D=(q, FR, S, a, b, P, n, h) comprises a step of determination of the cofactor h.

Hence, in one embodiment, the device (either the server or the smart card) can perform a faster domain parameter generation than technique known in the state of the art (for example the algorithm 4.14 of the document A1).

When the device has realized such determination of a secure domain parameters D, it can send it to the other device. Then, the other device has to validate such received domain parameters D. Such validation step comprises a step of determining a particular value and a comparison of such value with the cofactor comprised in the received domain parameters D. The present technique can also be applied in the validation step performed by such other device, in order to speed up the validation step.

When the two devices share the same domain parameters D (which has been validated by the receiving device), they can use it in order to:

perform a secret key exchange by using for example the ECDH or the ECC CDH (which comprises a cofactor multiplication, as mentioned in §5.7.1.2 of the document referenced SP 800-56A, and entitled <<Recommendation for Pair-Wise Key Establishment Schemes Using Discrete Logarithm Cryptography>>, published by the NIST);

perform signatures and verification of signatures (by the use of the ECDSA);

perform key pair generation (see for example the algorithm 4.24 in the §4.3 of the document A1);

perform a public key validation; and perform all the other cryptographic protocols based on the use of elliptic curves.

In another embodiment, when a device receives a domain parameters D for which the value of the cofactor is missing, such device can use the present technique in order to recover the value of the cofactor, in a faster way than known technique in the state-of-the art.

In one embodiment, a device A obtains domain parameters D, as well a public key $Q_B=d_B P$ of another device B (where $d_B$ is a private key of the device B) in order to perform a key exchange by the use of the ECC CDH. First of all, it verifies if there is a value of the cofactor h comprised in the obtained domain parameter D. In the case that no value is provided in the obtained domain parameter D, the device A performs a determination of the cofactor h according to the present disclosure. Then it obtains a secret key $d_A$ (which is stored for example in a memory of the device A) and computes a point $T=(x_T, y_T)=hd_A Q_B$. If the point T is equal to the point at infinity, then an error occurs and the device A sends information related to such error to the other device B.

Before the determination of the point T, the device A sends also to the device B, a public key $Q_A=d_A P$. The device B will also verifies if there is a value of the cofactor h comprised in an obtained domain parameter D (which is the same as the one obtained by the device A). In the case that no value is provided in the obtained domain parameter D, the device B performs a determination of the cofactor according to the present disclosure. Then it obtains a secret key $d_B$ (which is stored for example in a memory of the device B) and computes a point $T'=(x_{T'}, y_{T'})=hd_B Q_A$. If the point T' is equal to the point at infinity, then an error occurs and the device sends information related to such error to the other device.

Otherwise, if no error occurs, the shared secret key between the devices A and B is the following value $Z=x_T=x_{T'}$.

Such secret key can then be used to encrypt the communications between the devices A and B.

Although the present disclosure has been described with reference to one or more examples, workers skilled in the art will recognize that changes may be made in form and detail without departing from the scope of the disclosure and/or the appended claims.

What is claimed is:

1. A method for cryptographic computations implemented in an electronic component implemented within a first electronic device, wherein the method comprises:
   determining a cofactor of an elliptic curve E defined over a finite field $F_q$ with q elements using the electronic component that is configured to determine the cofactor, said elliptic curve comprising a base point P having an order equal to n, wherein determining the cofactor comprises determining a value of floor$((q+2^{ceil(b/2)+1}+1)/n)$ as the cofactor when $n>6\sqrt{q}$ using the electronic component, where the function ceil corresponds to the ceiling function, floor corresponds to the floor function, and b corresponds to the size q in number of bits of q;
   performing, using the electronic component, a cryptographic function based on elliptic curve cryptography using the cofactor; and
   exchanging, by the first electronic device, data relating to said cryptographic function with a second electronic device.

2. The method for cryptographic computations according to claim 1 wherein $q=2^m$ where m is an integer greater than or equal to one.

3. The method for cryptographic computations according to claim 1 wherein q=p where p is a prime number greater than or equal to three.

4. The method for cryptographic computations according to claim 1, wherein the method comprises:
   a step of determining A:=36q;
   a step of determining B:=$n^2$;
   a step of comparing A and B.

5. The method for cryptographic computations according to claim 1, wherein the method comprises computations by the electronic device that are compliant with the ECC CDH protocol.

6. The method for cryptographic computations according to claim 1, wherein the electronic component is implemented within a first electronic device and wherein the method comprises:
   the first electronic device receiving domain parameters D of said elliptic curve E from a second electronic device.

7. The method of claim 1, further comprising:
   sending at least one secure domain parameter comprising the cofactor to a second electronic device for validation.

8. The method of claim 1, further comprising:
   receiving, by the electronic component, at least one secure domain parameter from a second electronic device for validation;
   determining, by the electronic component, whether the received at least one secure domain parameter comprises the cofactor;
   if the received at least one secure domain parameter does not comprise the cofactor, recovering the cofactor by performing the step of determining the cofactor.

9. The method of claim 1, further comprising:
   sending or receiving the cofactor as part of at least one secure domain parameter to or from a second electronic device; and
   using the at least one domain parameter to perform at least one of the following with the second electronic device:
   a secret key exchange;
   signatures and verification of signatures;
   key pair generation;
   a public key validation;
   a cryptographic protocol based on the use of elliptic curves.

10. The method of claim 1, further comprising:
    using the cofactor to determine a secret key shared between the electronic component and a second device; and
    conducting encrypted communications with the second electronic device using the shared secret key.

11. A computer-readable and non-transitory storage medium storing a computer program comprising a set of computer-executable instructions to implement a method for cryptographic computations when the instructions are executed by a computer of a first electronic device, wherein the instructions comprise:
    instructions, which when executed, configure the computer to determine a cofactor of an elliptic curve E defined over a finite field $F_q$ with q elements, said elliptic curve comprising a base point P having an order equal to n;
    instructions, which when executed, configure the computer to determine the cofactor as a value of floor$((q+2^{ceil(b/2)+1}+1)/n)$ when $n>6\sqrt{q}$, where the function ceil corresponds to the ceiling function, floor corresponds to the floor function, and b corresponds to the size q in number of bits of q;
    instructions, which when executed, configure the computer to perform a cryptographic function based on elliptic curve cryptography using the cofactor; and
    instructions, which when executed, configure the computer to exchange data relating to said cryptographic function with a second electronic device.

12. An electronic component of a first electronic device, comprising:
    means for performing cryptographic computations comprising means for determining the cofactor of an elliptic curve E defined over a finite body $F_q$ with q elements, said elliptic curve comprising a base point P having an order equal to n, said means for determining comprising means for determining the cofactor as a value of floor$((q+2^{ceil(b/2)+1}+1)/n)$ when $n>6\sqrt{q}$, where the function ceil corresponds to the ceiling function, floor corresponds to the floor function, and b corresponds to the size of q in number of bits;
    means for performing a cryptographic function based on elliptic curve cryptography using the cofactor; and
    means for exchanging data relating to said cryptographic function with a second electronic device.

13. The electronic component according to claim 12 wherein the means for determining a cofactor comprise means for comparing n and $6\sqrt{q}$.

14. An electronic component according to claim 12, wherein the electronic component is comprised within a secured module.

15. The electronic component of claim 12, further comprising:

means for sending at least one secure domain parameter comprising the cofactor to a second electronic device for validation.

16. The electronic component of claim 12, wherein:

the means for exchanging comprises means for receiving, by the electronic component, at least one secure domain parameter from the second electronic device for validation, and wherein the electronic component further comprises:

means for determining whether the received at least one secure domain parameter comprises the cofactor;

means for, if the received at least one secure domain parameter does not comprise the cofactor, recovering the cofactor by performing the step of determining the cofactor.

17. The electronic component of claim 12, wherein:

the means for exchanging comprises means for sending or receiving the cofactor as part of at least one secure domain parameter to or from a second electronic device; and wherein the electronic component further comprises:

means for using the at least one domain parameter to perform at least one of the following with the second electronic device:
- a secret key exchange;
- signatures and verification of signatures;
- key pair generation;
- a public key validation;
- a cryptographic protocol based on the use of elliptic curves.

18. The electronic component of claim 12, further comprising:

means for using the cofactor to determine a secret key shared between the electronic component and the second device; and the means for exchanging comprises means for conducting encrypted communications with the second electronic device using the shared secret key.

* * * * *